Oct. 8, 1968  S. L. BELCHER ET AL  3,404,642
PALLET
Filed July 27, 1967  3 Sheets-Sheet 1

INVENTOR.
SAMUEL L. BELCHER
CHARLES E. RYMAN JR.
Philip N. Rice
& W. A. Schaich
ATTORNEYS Oct. 8, 1968  S. L. BELCHER ET AL  3,404,642
PALLET Filed July 27, 1967  3 Sheets-Sheet 2

INVENTOR.
SAMUEL L. BELCHER
BY CHARLES E. RYMAN Jr.
Philip M. Rice
& W. A. Schaich
ATTORNEYS

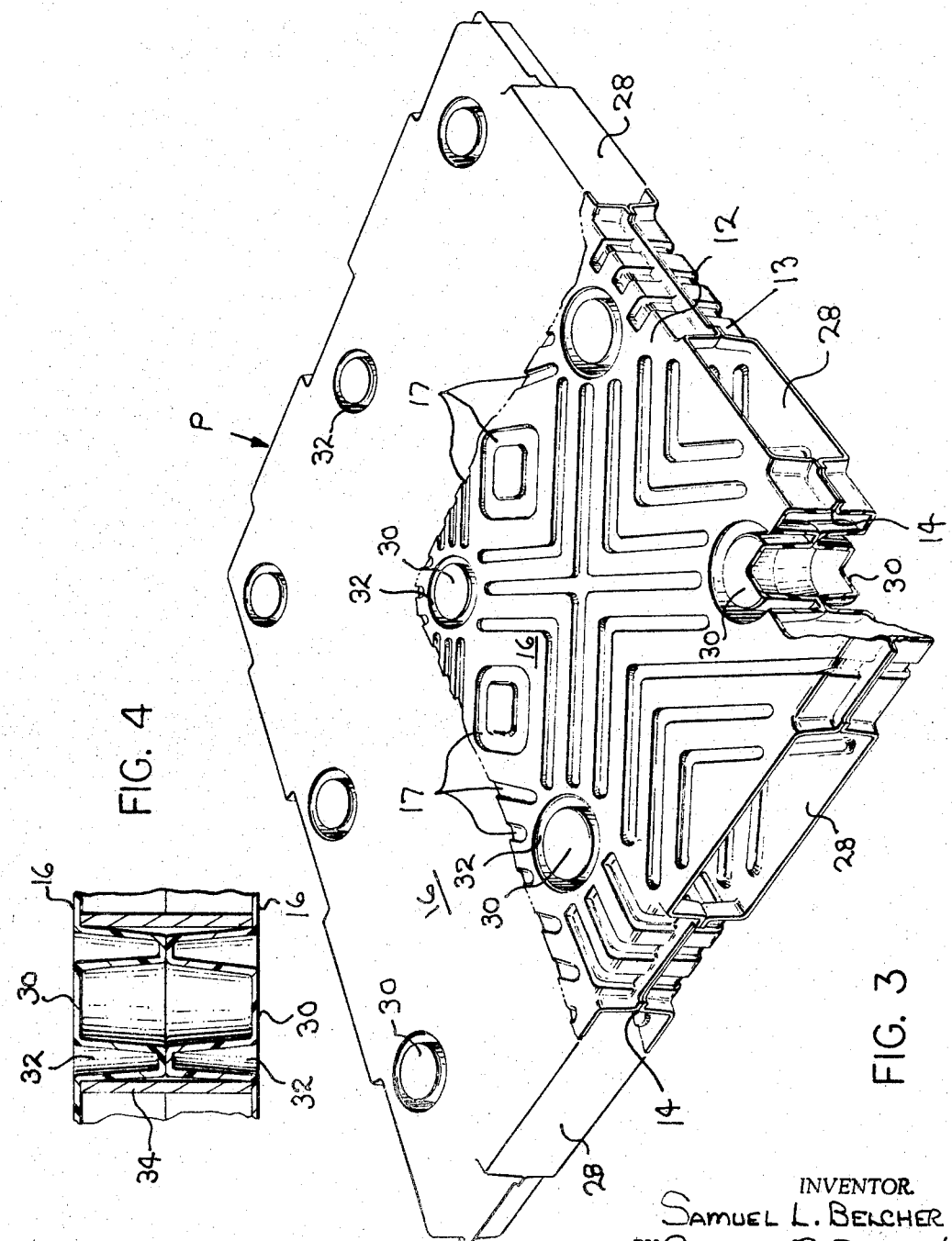

United States Patent Office 3,404,642
Patented Oct. 8, 1968

3,404,642
PALLET
Samuel L. Belcher and Charles E. Ryman, Jr., Toledo, Ohio, assignors to Owens-Illinois, Inc., a corporation of Ohio
Filed July 27, 1967, Ser. No. 656,459
7 Claims. (Cl. 108—51)

ABSTRACT OF THE DISCLOSURE

A pallet is formed from a pair of thermoplastic sheets joined at a central plane to form a unitary structure. Each sheet has a planar portion for receiving and supporting articles placed thereon and a plurality of pockets indented from the planar portion. Pockets of the respective sheets are joined at the central plane to form a column supporting the planar portions of the sheets in spaced relationship.

---

Pallets formed of wood are well known to anyone involved in material handling. Such pallets have the disadvantage of being very heavy, and therefore, cumbersome to handle when manual handling is needed to properly position the pallets. Additionally, wooden pallets are susceptible to terminate damage and to rotting.

It is an object of the present invention to provide a plastic pallet capable of supporting and handling relatively large loads, which pallet is itself relatively light in weight. The concept of forming a pallet from plastic material is not in and of itself new. For example, a plastic pallet is disclosed in United States Patent No. 2,544,743. However, it is believed that the plastic pallet disclosed and claimed in the present application is superior to any heretofore proposed. Thus, the pallet of the present invention is exceptionally strong and is reversible in that either side may be up to support the load. Furthermore, it can receive the lifting members of a fork-lift truck from any of its four sides, and is relatively economical to manufacture.

Accordingly, it is an object of the present invention to provide a plastic pallet which can be readily and economically formed and yet which is sufficiently strong to hold the anticipated loads.

Other objects and advantages of the present invention will be readily apparent from the following description taken in conjunction with the annexed sheets of drawings on which:

FIGURE 3 is a view similar to FIGURE 2 illustrating a modified embodiment.

FIGURE 4 is a sectional view of a supporting column similar to that illustrated in FIGURE 3 but having a reinforcing member added thereto.

Figure 1:
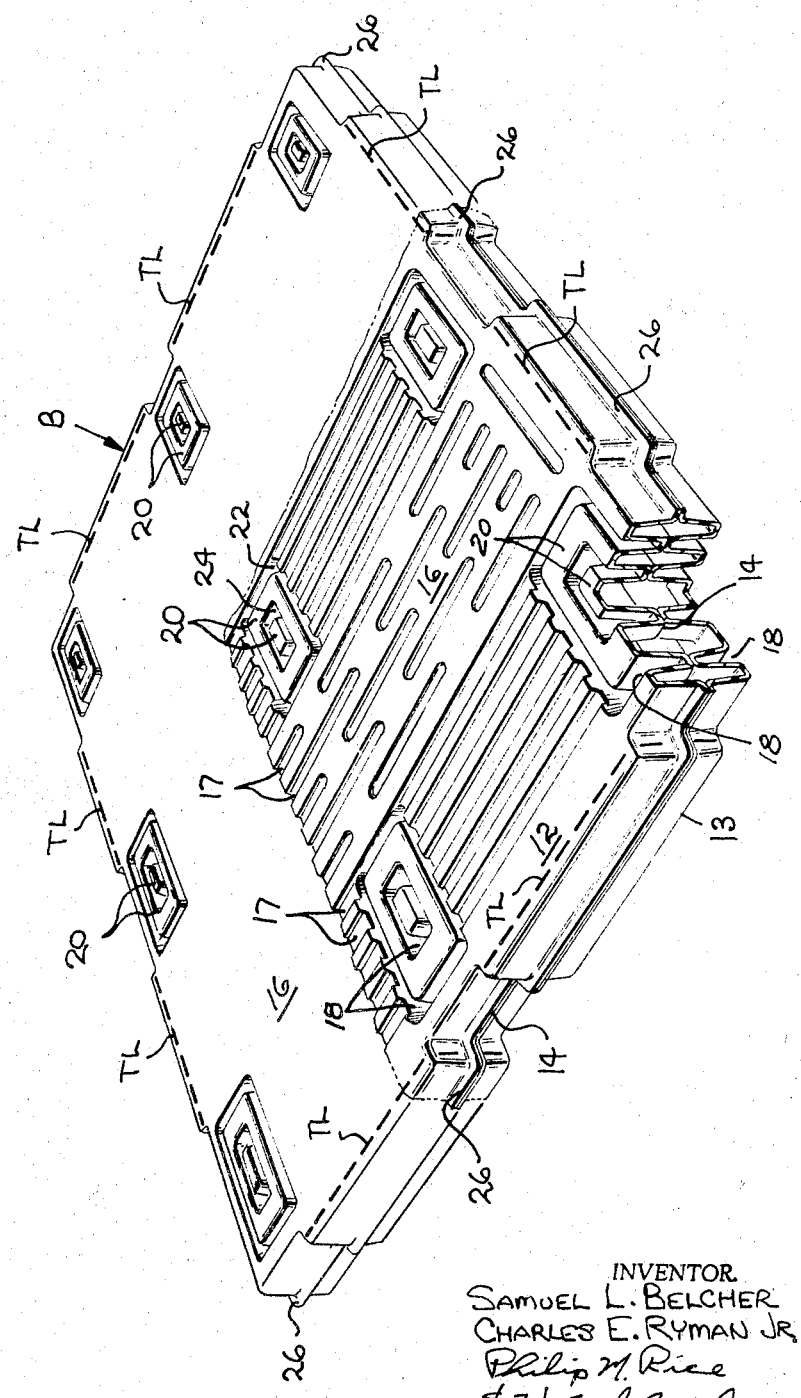
FIGURE 1 is a perspective view of the molded blank from which the pallet of the present invention is formed with a corner broken away to show the cross sectional configuration of the supporting columns.

Referring now to the drawings, there is provided a molded blank B for a pallet P formed of an upper sheet 12 and a lower sheet 13 of thermoplastic material, portions of which are joined at a central plane 14. Each of the sheets 12 and 13 includes a generally planar surface 16 upon which articles may be supported. If desired, the planar surface 16 may be provided with recessed areas 17 of any desired pattern which serve as an anti-skid feature. Only a portion of the surface 16 has been drawn with such recessed areas 17; however, it will be understood that such anti-skid feature will customarily cover the entire surface.

Each of the sheets has molded therein a plurality of column-forming pockets 18. Each of the column-forming pockets 18 of one sheet 12 is joined to a corresponding column-forming pocket 18 of the opposite sheet 13 at the central plane 14. Thus, the pockets 18 cooperate to form columns 20 for supporting the planar load bearing surfaces 16 of the respective sheets 12 and 13 in a spaced relationship.

Figure 2:
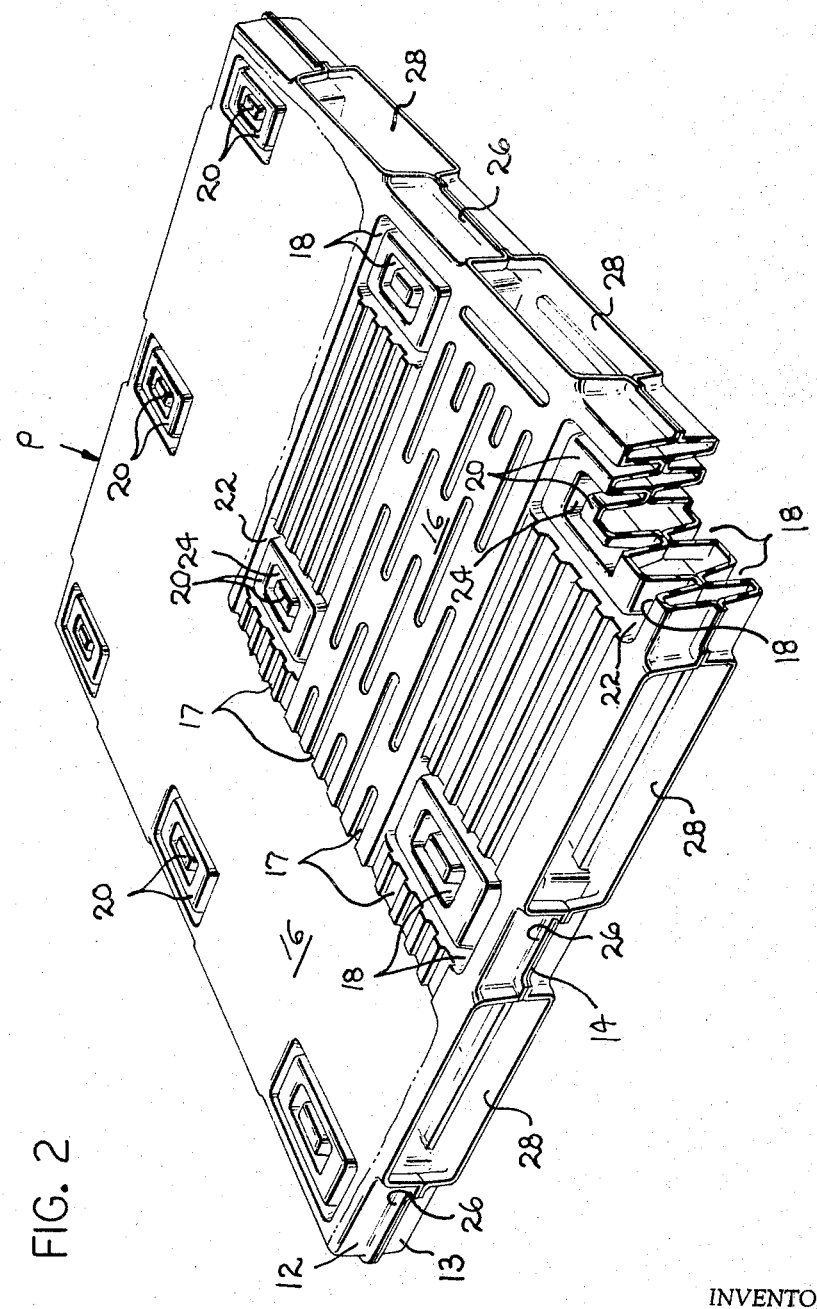
FIGURE 2 is a view similar to FIGURE 1 showing a finished pallet formed by cutting selected portions of the blank.

In the embodiment shown in FIGURES 1 and 2, each of the column-forming pockets 18 includes an outer depressed area 22 of rectangular configuration encircling an inner depressed area 24 of rectangular configuration. The inner and outer depressed areas 22 and 24 of one sheet 12 are joined to corresponding depressed areas of the other sheet 13 at the central plane 14 to form the structural column 20. Thus an inner column is encircled by an outer column.

The columns arranged in ranks and files of three each, a total of nine columns, are in a spaced relationship to provide a pair of passageways 28 in each direction which are sized and spaced apart to receive the lifting members of a fork-lift truck.

The outer peripheries of the respective sheets 12 and 13 are also joined at the central plane 14 to form a peripheral flange 26. As will be noted from viewing FIGURE 1, the flange 26 of the blank B extends completely around the periphery thereof. The portions of the flange 26 positioned between the rows and files of columns 20 extend outwardly from the portions aligned with such rows and files. Such outwardly extending portions also include peripheral portions of the planar surfaces 16. Such construction permits the blank B (FIGURE 1) to be converted to the finished pallet P (FIGURE 2) merely by trimming each of the outwardly extending portions at a trim line shown in dotted lines and designated by the letters TL (FIGURE 1) thus opening the passageways 28 (FIGURE 2).

Additionally, it permits the portions of the flange 26 aligned with the rows and files to remain intact thus giving additional strength and rigidity to the pallet P, particularly at the corners.

Referring now to FIGURE 3 there is illustrated a modification in which the pallet P is provided with columns 30 circular in cross sectional configuration. In this embodiment, each of the columns 30 is defined by a single column-forming pocket 32 in each of the sheets 12 and 13. FIGURE 3 shows the finished pallet P after outwardly extending portions similar to those described in the previous embodiment have been trimmed. Hence, the passageways 28 are open and ready to receive the lifting members of a fork lift. The only other difference between this embodiment and the embodiment of FIGURES 1 and 2 is in the design of the recessed portions 17 forming the anti-skid feature.

Referring now to FIGURE 4, there is illustrated an additional modification in which a circular column 30, such as that illustrated in FIGURE 3, is provided. In this embodiment, a circular reinforcing element 34 is positioned to encircle each of the column-forming pockets 32. The reinforcing element 34 extends between the planar, load bearing surfaces 16 of the respective sheets 12 and 13. The reinforcing elements may be formed of any desired material possessing sufficient strength to withstand compressive loads. Solid fibreboard is recommended because it possesses such strength and is quite economical. However, metal, reinforced plastics or other materials could be used.

It can thus be seen from the foregoing description that the present invention provides a pallet which can be easily and economically molded from a minimum number of members, namely two sheets of thermoplastic material. Additionally, only a very simple trimming operation is needed to form the finished pallet from the initially molded object.

Several modifications will undoubtedly be readily apparent to those skilled in the art. Accordingly, it is not the intention to limit the scope of the present invention other than is required by the appended claims.

We claim:

1. A pallet comprising first and second sheets of thermoplastic material having selected portions joined at a central plane to form a unitary structure, each of said sheets having a major substantially planar portion for receiving and supporting articles placed thereon, a plurality of pockets indented from said planar portion, each of said pockets joined at said central plane to a corresponding pocket of the other of said sheets and cooperating therewith to form a column supporting the adjacent planar portions of said sheets in spaced relationship to each other, said pockets arranged to support the planar portion of said sheets in spaced relationship, said columns being arranged in rows to permit the entry of lifting forks therebetween, the peripheral edge portions of said sheets aligned with said rows of columns being joined at said central plane and the peripheral edge portions lying between said rows of columns defining lifting fork entry openings.

2. The pallet as defined in claim 1 wherein said columns are arranged in three rows of three each and are spaced apart in both the longitudinal and transverse directions to permit the entry of a lifting fork therebetween from either direction.

3. The pallet as defined in claim 1 wherein each of the pockets includes an outer indented area encircling an inner indented area.

4. The pallet as defined in claim 1 further including an annular reinforcing element encircling said columns, said reinforcing element extending from the planar portion of said first sheet to the planar portion of said second sheet.

5. A plastic blank convertible to a pallet comprising a pair of molded sheets each having a load receiving surface and a plurality of column defining pockets recessed from said load receiving surface, the column defining pockets of one sheet joined to the column defining pockets of the other sheet at a central plane to form columns, said columns arranged in ranks and files with spaces therebetween for receiving a pair of lifting members, the peripheral edges of said sheets being joined at said central plane.

6. The blank as defined in claim 5 wherein the portions of said peripheral edges between said ranks and files of columns extends outwardly from the portions aligned with said ranks and files.

7. The pallet as defined in claim 1 wherein the peripheral edge portions defining the lifting fork entry openings extend outwardly from the peripheral edge portions aligned with said rows of columns.

References Cited

UNITED STATES PATENTS

| | | | |
|---|---|---|---|
| 2,991,965 | 7/1961 | Drieborg | 108—58 |
| 3,187,689 | 6/1965 | Hess | 108—58 |
| 3,187,691 | 6/1965 | Leitzel | 108—58 |
| 3,228,358 | 1/1966 | Sepe et al. | 108—58 |
| 3,269,336 | 8/1966 | Naylor et al. | 108—58 |
| 3,302,593 | 2/1967 | Roberts | 108—56 |
| 3,307,504 | 3/1967 | Cloyd et al. | 108—58 |
| 3,330,228 | 7/1967 | Donnelly | 108—51 |

BOBBY R. GAY, *Primary Examiner.*

G. O. FINCH, *Assistant Examiner.*